United States Patent
Kodama et al.

(10) Patent No.: US 10,851,243 B2
(45) Date of Patent: Dec. 1, 2020

(54) ROOM TEMPERATURE CURABLE ORGANOPOLYSILOXANE COMPOSITION FOR PROTECTING ELECTRIC/ELECTRONIC PARTS

(71) Applicant: Dow Corning Toray Co., Ltd., Tokyo (JP)

(72) Inventors: Harumi Kodama, Ichihara (JP); Masayuki Onishi, Ichihara (JP)

(73) Assignee: Dow Toray Co., Ltd., Tokyo (JP)

( * ) Notice: Subject to any disclaimer, the term of this patent is extended or adjusted under 35 U.S.C. 154(b) by 28 days.

(21) Appl. No.: 16/326,042

(22) PCT Filed: Aug. 10, 2017

(86) PCT No.: PCT/JP2017/029043
§ 371 (c)(1),
(2) Date: Feb. 15, 2019

(87) PCT Pub. No.: WO2018/034222
PCT Pub. Date: Feb. 22, 2018

(65) Prior Publication Data
US 2019/0177487 A1    Jun. 13, 2019

(30) Foreign Application Priority Data

Aug. 19, 2016 (JP) ................. 2016-161185

(51) Int. Cl.
| C08L 83/04 | (2006.01) |
| C08K 3/22 | (2006.01) |
| C08K 5/47 | (2006.01) |
| C08K 3/26 | (2006.01) |
| C08G 77/08 | (2006.01) |
| C08K 3/36 | (2006.01) |
| C08K 13/02 | (2006.01) |

(52) U.S. Cl.
CPC ............. *C08L 83/04* (2013.01); *C08G 77/08* (2013.01); *C08K 3/22* (2013.01); *C08K 3/26* (2013.01); *C08K 3/36* (2013.01); *C08K 5/47* (2013.01); *C08K 13/02* (2013.01); *C08K 2003/2296* (2013.01); *C08K 2201/006* (2013.01); *C08K 2201/014* (2013.01)

(58) Field of Classification Search
CPC .. C08K 5/3412; C08K 5/3415; C08K 5/3417; C08K 5/37; C08K 5/375; C08K 5/378; C08K 5/44; C08K 2003/2296; H01L 23/296; H01L 33/56; C09D 183/04; C08L 83/04

See application file for complete search history.

(56) References Cited

U.S. PATENT DOCUMENTS

| 4,485,206 A | 11/1984 | Inoue et al. | |
| 4,818,777 A | 4/1989 | Braig | |
| 4,975,479 A | 12/1990 | Satake et al. | |
| 2006/0257672 A1 | 11/2006 | Horikoshi et al. | |
| 2014/0145226 A1* | 5/2014 | Hohn | C09D 7/61 257/98 |
| 2015/0299543 A1* | 10/2015 | Miyamoto | C08L 83/04 257/100 |
| 2016/0233395 A1* | 8/2016 | Miyamoto | C08G 77/44 |
| 2017/0037287 A1* | 2/2017 | Kodama | C08L 83/00 |
| 2019/0177584 A1* | 6/2019 | Gubbels | C08L 83/00 |

FOREIGN PATENT DOCUMENTS

| JP | S5980463 A | 5/1984 |
| JP | H0476056 A | 3/1992 |
| JP | 2006152181 A | 6/2006 |
| JP | 2006316184 A | 11/2006 |
| JP | 2012251058 A | 12/2012 |
| WO | 2012066998 A1 | 5/2012 |

OTHER PUBLICATIONS

Abstract for CN 111054396 A (Apr. 2020).*
English translation of International Search Report for PCT/JP2017/029043 dated Oct. 17, 2017, 3 pages.
Machine assisted translation of JPH0476056A obtained from https://worldwide.espacenet.com on May 8, 2019, 6 pages.
Machine assisted translation of JP2006152181A obtained from https://patents.google.com on May 8, 2019, 8 pages.
Machine assisted translation of WO2012066998A1 obtained from https://patents.google.com on May 8, 2019, 23 pages.
Machine assisted translation of JP2012251058A1 obtained from https://patents.google.com on May 8, 2019, 20 pages.

* cited by examiner

*Primary Examiner* — Marc S Zimmer
(74) *Attorney, Agent, or Firm* — Warner Norcross + Judd LLP

(57) ABSTRACT

A room temperature curable organopolysiloxane composition for protecting electric/electronic parts is disclosed. The composition comprises: (A) an organopolysiloxane having a viscosity at 25° C. of 20 to 1,000,000 mPa·s and having at least two silicon atom-bonded hydroxyl groups or silicon atom-bonded alkoxy groups in a molecule; (B) an alkoxysilane represented by the following general formula or a partial hydrolysis condensation product thereof: $R^1_a Si(OR^2)_{(4-a)}$ wherein $R^1$ is a monovalent hydrocarbon group having a carbon number of 1 to 12, $R^2$ is an alkyl group having a carbon number of 1 to 3, and subscript "a" is an integer of 0 to 2; (C) a mercaptobenzothiazole based compound; (D) zinc oxide powder and/or zinc carbonate powder; and (E) a catalyst for condensation reactions. The composition and/or a cured product thereof can protect electric/electronic parts from corrosive gases such as hydrogen sulfide gas and sulfuric acid contained in the atmosphere.

12 Claims, No Drawings

ROOM TEMPERATURE CURABLE ORGANOPOLYSILOXANE COMPOSITION FOR PROTECTING ELECTRIC/ELECTRONIC PARTS

CROSS-REFERENCE TO RELATED APPLICATIONS

This application is the National Stage of International Application No. PCT/JP2017/029043 filed on 10 Aug. 2017, which claims priority to and all advantages of Japanese Patent Appl. No. 2016-161185 filed on 19 Aug. 2016, the content of which is hereby incorporated by reference.

TECHNICAL FIELD

The present invention relates to a room temperature curable organopolysiloxane composition for protecting electric/electronic parts from corrosive gases such as hydrogen sulfide gas and sulfuric acid contained in the atmosphere.

BACKGROUND ART

In order to protect electric/electronic parts from corrosive gases such as hydrogen sulfide gas and sulfuric acid contained in the atmosphere, for example, Patent Document 1 proposes a room temperature curable organopolysiloxane composition containing an imidazole compound or a thiazole compound, Patent Document 2 proposes a room temperature curable organopolysiloxane composition containing a nonaromatic amino group containing compound, and Patent Document 3 proposes a room temperature curable organopolysiloxane composition containing a thiazole compound and/or a triazine compound. Unfortunately, even these room temperature curable organopolysiloxane compositions problematically cannot sufficiently protect electric/electronic parts from corrosive gas.

In contrast, Patent Document 4 proposes a room temperature curable organopolysiloxane composition containing one or two or more compounds selected from zinc carbonate and/or zinc oxide, as well as thiazole, thiuram, and thiocarbamate. Unfortunately, this is used for seals around automobile engines, etc. requiring oil resistance and does not disclose the use thereof in protecting electric/electronic parts from corrosive gas.

CITATION LIST

Patent Literature

Patent Document 1: Japanese Unexamined Patent Application Publication No. 2006-152181
Patent Document 2: Japanese Unexamined Patent Application Publication No. 2006-316184
Patent Document 3: Japanese Unexamined Patent Application Publication No. 2012-251058
Patent Document 4: Japanese Unexamined Patent Application Publication No. Sho 59-80463

SUMMARY OF INVENTION

Technical Problem

An object of the present invention is to provide a room temperature curable organopolysiloxane composition for protecting electric/electronic parts from corrosive gases such as hydrogen sulfide gas and sulfuric acid contained in the atmosphere.

Solution to Problem

The room temperature curable organopolysiloxane composition for protecting electric/electronic parts according to the present invention, comprising:

(A) 100 parts by mass of an organopolysiloxane having a viscosity at 25° C. of 20 to 1,000,000 mPa·s and having at least two silicon atom-bonded hydroxyl groups or silicon atom-bonded alkoxy groups in a molecule;

(B) 0.5 to 15 parts by mass of an alkoxysilane represented by the following general formula or a partial hydrolysis condensation product thereof:

$$R^1_a Si(OR^2)_{(4-a)}$$

wherein $R^1$ is a monovalent hydrocarbon group having a carbon number of 1 to 12, $R^2$ is an alkyl group having a carbon number of 1 to 3, and "a" is an integer of 0 to 2;

(C) 0.001 to 0.5 parts by mass of a mercaptobenzothiazole based compound;

(D) 0.1 to 30 parts by mass of zinc oxide powder and/or zinc carbonate powder; and (E) 0.1 to 10 parts by mass of a catalyst for condensation reactions.

Effects of Invention

The room temperature curable organopolysiloxane composition for protecting electric/electronic parts according to the present invention can protect electric/electronic parts from corrosive gases such as hydrogen sulfide gas and sulfuric acid contained in the atmosphere.

DETAILED DESCRIPTION OF THE INVENTION

Component (A) is an organopolysiloxane having at least two silicon atom-bonded hydroxyl groups or silicon atom-bonded alkoxy groups in a molecule. Examples of this alkoxy group may include alkoxy groups having a carbon number of 1 to 6 such as a methoxy group, an ethoxy group, a propoxy group, and a butoxy group. Examples of other silicon atom-bonded groups in component (A) may include alkyl groups having a carbon number of 1 to 12 such as a methyl group, an ethyl group, a propyl group, a butyl group, a pentyl group, and an octyl group; cycloalkyl groups having a carbon number of 5 to 12 such as a cyclopentyl group, a cyclohexyl group, and a cycloheptyl group; alkenyl groups having a carbon number of 2 to 12 such as a vinyl group, an allyl group, a butenyl group, and a hexenyl group; aryl groups having a carbon number of 6 to 12 such as a phenyl group, a tolyl group, a xylyl group, and a naphthyl group; aralkyl groups having a carbon number of 7 to 12 such as a benzyl group and a phenethyl group; and groups obtained by substituting part or all hydrogen atoms of these groups for halogen atoms such as chlorine atoms and fluorine atoms, with a methyl group, a vinyl group, and a phenyl group preferable. While the molecular structure of component (A) is not limited, examples thereof may include a linear structure, a partially branched linear structure, a branched structure, a ring structure, and a resin structure, with a linear structure and a partially branched linear structure preferable. While the binding position of a hydroxyl group or an alkoxy group in such component (A) is not limited, for example, it preferably bonds to silicon atoms at the terminal of the molecular chain and/or silicon atoms within the molecular chain. Moreover, an alkoxy group in component (A) may directly bond to silicon atoms within the molecular chain, or may bond to silicon atoms that bond to silicon atoms within the molecular chain via a bivalent hydrocarbon group. Specific examples thereof may include an alkoxy group in an alkoxysilylalkyl group such as a trimethoxysilylethyl group, a methyldimethoxysilylethyl group, a triethoxysilylethyl group, and a trimethoxysilylpropyl group.

Component (A) has a viscosity at 25° C. in the range of 20 to 1,000,000 mPa·s, preferably in the range of 100 to 500,000 mPa·s, or in the range of 300 to 500,000 mPa·s. This is because, when the viscosity of component (A) is not less than the lower limit of the abovementioned range, the obtained cured product has superior mechanical strength; in contrast, when it is not more than the upper limit of the abovementioned range, the obtained composition has favorable handling workability.

Examples of such component (A) may include a dimethylpolysiloxane having both molecular chain terminals blocked with hydroxy groups, a dimethylsiloxane.methylvinylsiloxane copolymer having both molecular chain terminals blocked with hydroxy groups, a dimethylsiloxane.methylphenylsiloxane copolymer having both molecular chain terminals blocked with hydroxy groups, a dimethylsiloxane.methyl(3,3,3-trifluoropropyl)siloxane copolymer having both molecular chain terminals blocked with hydroxy groups, a dimethylpolysiloxane having both molecular chain terminals blocked with trimethoxysiloxy groups, a dimethylsiloxane.methylvinylsiloxane copolymer having both molecular chain terminals blocked with trimethoxysiloxy groups, a dimethylsiloxane.methylphenylsiloxane copolymer having both molecular chain terminals blocked with trimethoxysiloxy groups, a dimethylsiloxane.methyl(3,3,3-trifluoropropyl)siloxane copolymer having both molecular chain terminals blocked with trimethoxysiloxy groups, a dimethylpolysiloxane having both molecular chain terminals blocked with trimethoxysilylethyldimethylsiloxy groups, a dimethylsiloxane.methylvinylsiloxane copolymer having both molecular chain terminals blocked with trimethoxysilylethyldimethylsiloxy groups, a dimethylsiloxane.methylphenylsiloxane copolymer having both molecular chain terminals blocked with trimethoxysilylethyldimethylsiloxy groups, a dimethylsiloxane.methyl(3,3,3-trifluoropropyl)siloxane copolymer having both molecular chain terminals blocked with trimethoxysilylethyldimethylsiloxy groups, and mixtures of two or more thereof.

Component (B) is a curing agent of this composition, and is an alkoxysilane represented by the following general formula or a partial hydrolysis condensation product thereof:

$R^1_a Si(OR^2)_{(4-a)}$,

In the above formula, $R^1$ is a monovalent hydrocarbon group having a carbon number of 1 to 12, with specific examples thereof potentially including alkyl groups having a carbon number of 1 to 12 such as a methyl group, an ethyl group, a propyl group, a butyl group, a pentyl group, and an octyl group; cycloalkyl groups having a carbon number of 5 to 12 such as a cyclopentyl group, a cyclohexyl group, and a cycloheptyl group; alkenyl groups having a carbon number of 2 to 12 such as a vinyl group, an allyl group, a butenyl group, and a hexenyl group; aryl groups having a carbon number of 6 to 12 such as a phenyl group, a tolyl group, a xylyl group, and a naphthyl group; aralkyl groups having a carbon number of 7 to 12 such as a benzyl group and a phenethyl group; and groups obtained by substituting part or all hydrogen atoms of these groups for halogen atoms such as chlorine atoms and fluorine atoms, with a methyl group, a vinyl group, and a phenyl group preferable.

Moreover, in the above formula, $R^2$ is an alkyl group having a carbon number of 1 to 3, with examples thereof potentially including a methyl group, an ethyl group, and a propyl group, with a methyl group and an ethyl group preferable.

Moreover, in the above formula, "a" is an integer of 0 to 2, preferably 1.

Examples of such component (B) may include tetrafunctional alkoxysilanes such as tetramethoxysilane, tetraethoxysilane, and methyl cellosolve orthosilicate; trifunctional alkoxysilanes such as methyltrimethoxysilane, methyltriethoxysilane, ethyltrimethoxysilane, vinyltrimethoxysilane, and phenyltrimethoxysilane; bifunctional alkoxysilanes such as dimethyldimethoxysilane, dimethyldiethoxysilane, diethyldimethoxysilane, divinyldimethoxysilane, and diphenyldimethoxysilane; and partial hydrolysis condensation products of these alkoxysilanes. In this composition, two or more thereof may be mixed and used as component (B).

The content of component (B) is, with respect to 100 parts by mass of component (A), in the range of 0.5 to 15 parts by mass, preferably in the range of 1 to 15 parts by mass. This is because, when the content of component (B) is not less than the lower limit of the abovementioned range, the obtained composition is sufficiently cured; in contrast, when it is not more than the upper limit of the abovementioned range, the stability of the obtained composition is improved.

Component (C) is a mercaptobenzothiazole based compound for protecting electric/electronic parts from corrosive gases such as hydrogen sulfide gas and sulfuric acid which are contained in the atmosphere, along with component (D) in this composition. Examples of such component (C) may include mercaptobenzothiazole, dibenzothiazyl disulfide, a sodium salt of mercaptobenzothiazole, a zinc salt of mercaptobenzothiazole, a cyclohexylamine salt of mercaptobenzothiazole, morpholinodithiobenzothiazole, N-cyclohexylbenzothiazolyl sulfenamide, N-oxydiethylenebenzothiazolyl sulfenamide, N-tert-butylbenzothiazolyl sulfenamide, and mixtures of two or more thereof, with mercaptobenzothiazole preferable.

The content of component (C) is, with respect to 100 parts by mass of component (A), in the range of 0.001 to 0.5 parts by mass, preferably in the range of 0.005 to 0.1 parts by mass. This is because, when the content of component (C) is not less than the lower limit of the abovementioned range, it is possible to sufficiently protect electric/electronic parts from corrosive gases such as hydrogen sulfide gas and sulfuric acid contained in the atmosphere; in contrast, when it is not more than the upper limit of the abovementioned range, the mechanical properties of the obtained cured product are favorable.

Component (D) is a zinc oxide powder and/or zinc carbonate powder for protecting electric/electronic parts from corrosive gases such as hydrogen sulfide gas and sulfuric acid which are contained in the atmosphere, along with component (C) in this composition. Examples of such component (D) may include a zinc oxide powder that is surface coated with an oxide and/or hydroxide of at least one element selected from the group consisting of Al, Ag, Cu, Fe, Sb, Si, Sn, Ti, Zr, and rare earth elements; a zinc oxide powder that is surface coated with an organosilicon compound not having an alkenyl group; a hydrate powder of zinc carbonate; and mixtures thereof. While the particle diameter of component (D) is not limited, the BET specific surface area thereof is preferably at least 10 m²/g or at least 50 m²/g.

In the zinc oxide powder that is surface coated with an oxide, exemplary rare earth elements may include yttrium, cerium, and europium. Examples of the oxide on the surface of the zinc oxide powder may include $Al_2O_3$, AgO, $Ag_2O$, $Ag_2O_3$, CuO, $Cu_2O$, FeO, $Fe_2O_3$, $Fe_3O_4$, $Sb_2O_3$, $SiO_2$, $SnO_2$, $Ti_2O_3$, $TiO_2$, $Ti_3O_5$, $ZrO_2$, $Y_2O_3$, $CeO_2$, $Eu_2O_3$, and mixtures of two or more these oxides; and further, hydrated oxides such as $Al_2O_3 \cdot nH_2O$, $Fe_2O_3 \cdot nH_2O$, $Fe_3O_4 \cdot nH_2O$, $Sb_2O_3 \cdot nH_2O$, $SiO_2 \cdot nH_2O$, $TiO_2 \cdot nH_2O$, $ZrO_2 \cdot nH_2O$, $CeO_2 \cdot nH_2O$, with $Al_2O_3$ and $SiO_2$ preferable. Note that while "n" is generally a positive integer, depending on the degree of dehydration, "n" is not necessarily limited to an integer.

In the zinc oxide powder that is surface coated with a hydroxide, exemplary rare earth elements may include yttrium, cerium, and europium. Examples of the hydroxide on the surface of the zinc oxide powder may include $Al(OH)_3$, $Cu(OH)_2$, $Fe(OH)_3$, $Ti(OH)_4$, $Zr(OH)_3$, $Y(OH)_3$, $Ce(OH)_3$, $Ce(OH)_4$, and mixtures of two or more these oxides; and further, hydrated oxides such as $Ce(OH)_3 \cdot nH_2O$, with $Al(OH)_3$ preferable. Note that while "n" is generally a positive integer, depending on the degree of dehydration, "n" is not necessarily limited to an integer.

Note that the zinc oxide powder that is surface film coated with the abovementioned oxide may be further surface coated with the abovementioned hydroxide, and may be further surface coated with the abovementioned other oxides. Moreover, the zinc oxide powder that is surface coated with the abovementioned hydroxide may be further surface coated with the abovementioned oxide, and may be further surface coated with the abovementioned other hydroxides. Moreover, component (D) may be a zinc oxide powder that is surface film coated with the abovementioned oxide and the abovementioned hydroxide. Exemplary combinations of the oxide and the hydroxide may include the combination of $Al_2O_3$ and $Al(OH)_3$, along with the combination of $SiO_2$ and $Al(OH)_3$.

In the zinc oxide powder that is surface treated with an organosilicon compound, this organosilicon compound does not have an alkenyl group, with examples thereof potentially including organosilane, organosilazane, polymethylsiloxane, organohydrogenpolysiloxane, and an organosiloxane oligomer, with specific examples thereof potentially including organochlorosilanes such as trimethylchlorosilane, dimethylchlorosilane, and methyltrichlorosilane; organotrialkoxysilanes such as methyltrimethoxysilane, methyltriethoxysilane, phenyltrimethoxysilane, ethyltrimethoxysilane, and n-propyltrimethoxysilane; diorganodialkoxysilanes such as dimethyldimethoxysilane, dimethyldiethoxysilane, and diphenyldimethoxysilane; triorganoalkoxysilanes such as trimethylmethoxysilane and trimethylethoxysilane; partial condensation products of these organoalkoxysilanes; organosilazanes such as hexamethyldisilazane; polymethylsiloxane, organohydrogenpolysiloxane, organosiloxane oligomers that have a silanol group or an alkoxy group; and resin type organopolysiloxanes that include $R^8SiO_{3/2}$ units (wherein $R^8$ is a monovalent hydrocarbon group excluding an alkenyl group exemplified by an alkyl group such as a methyl group, an ethyl group, or a propyl group; and an aryl group such as a phenyl group) and $SiO_{4/2}$ units and have a silanol group or an alkoxy group.

Moreover, the abovementioned zinc oxide powder may be further surface treated. Examples thereof may include higher fatty acids such as a stearic acid, as well as metal soaps thereof; higher fatty acids such as octyl palmitate; polyhydric alcohols such as trimethylolethane, trimethylolpropane, and pentaerythritol; and amine compounds such as diethanolamine and triethanolamine. Further, coupling agents such as alkyl titanate, alkyl aluminate, and alkyl zirconate, as well as fluorine based organic compounds such as perfluoroalkylsilane and perfluoroalkyl phosphoric ester, can also be used.

The hydrate powder of zinc carbonate is a compound with zinc carbonate binding to water, with the mass decreasing rate thereof under heating conditions of 105° C. and 3 hours preferably 0.1% by mass or greater.

The content of component (D) is, with respect to 100 parts by mass of component (A), in the range of 0.1 to 30 parts by mass, preferably in the range of 0.5 to 15 parts by mass. This is because, when the content of component (D) is not less than the lower limit of the abovementioned range, it is possible to sufficiently protect electric/electronic parts from corrosive gases such as hydrogen sulfide gas and sulfuric acid contained in the atmosphere; in contrast, when it is not more than the upper limit of the abovementioned range, the obtained composition has favorable handling workability.

Component (E) is a catalyst for condensation reactions for promoting crosslinking of this composition. Examples of such component (E) may include tin compounds such as dimethyl tin dineodecanoate and stannous octoate; and titanium compounds such as tetra(isopropoxy)titanium, tetra(n-butoxy)titanium, tetra(t-butoxy)titanium, di(isopropoxy)bis (ethylacetoacetate)titanium, di(isopropoxy)bis (methylacetoacetate)titanium, and di(isopropoxy)bis (acetylacetonate)titanium, with titanium compounds preferable.

The content of component (E) is, with respect to 100 parts by mass of component (A), in the range of 0.1 to 10 parts by mass, preferably in the range of 0.3 to 6 parts by mass. This is because, when the content of component (E) is not less than the lower limit of the abovementioned range, curing of the obtained composition is sufficiently promoted; in contrast, when it is not more than the upper limit of the abovementioned range, the storage stability of the obtained composition is improved.

As long as the object of the present invention is not impaired, this composition may contain, as other optional components, inorganic fillers such as fumed silica, precipitated silica, burned silica, quartz powder, calcium carbonate, aerosol titanium dioxide, diatomaceous earth, aluminum hydroxide, alumina, magnesia, and metal powder; fillers with these fillers surface treated with silanes, silazanes, silazanes having a low degree of polymerization, organic compounds, etc.; adhesion promoters such as silatran derivatives and carbasilatran derivatives; fungicides; fire retardants; heat resistant agents; plasticizers; thixotropic additives; pigments, etc.

While the method for preparing this composition is not limited, curing of this composition progresses due to moisture, and therefore the composition must be prepared while moisture shielded. Moreover, while moisture shielded, this composition can be stored as a one pack type or a two pack type. This composition is cured by moisture in the air to form a cured product.

Examples of the method for protecting electric/electronic parts using this composition may include application using a dispenser, application using a scraper, and application using a brush. Subsequently, this composition is cured. While the curing conditions of this composition are not limited, curing progresses even at room temperature, making it less likely that heat is applied to electric/electronic parts. Note that if the application of heat to the electric/electronic parts is not problematic, heating to 60° C. or lower may be carried out in order to promote curing of this composition.

This composition is left to stand at room temperature for approximately several minutes to one week so as to be cured.

EXAMPLES

The room temperature curable organopolysiloxane composition for protecting electric/electronic parts according to the present invention will be described in further detail using Examples. Note that the viscosity in the Examples is the value at 25° C. Moreover, sulfur corrosion testing of a silver electrode was carried out as follows.

<Sulfur Corrosion Test>

The room temperature curable organopolysiloxane composition prepared in Practical Examples and Comparative Examples was applied on a silver plated copper plate so as to have a thickness of 2 mm, and cured to manufacture a test piece. Subsequently, this test piece, along with 0.2 g of sulfur powder, was placed in a 100 cc glass bottle, sealed, heated to 70° C., and left to stand for 72 hours, after which the cured product was peeled and the degree of corrosion of the silver plating, as well as the state thereof, was visually observed and evaluated as follows.

○: corrosion is absent x: corrosion is present (blackening)

<Resistance Value>

Regarding the silver plated part obtained by peeling the cured product in the abovementioned sulfur corrosion test, the resistance value (Ω) at a distance of 2 cm between electrodes was measured using an electric tester.

Practical Example 1

While moisture shielded, 100 parts by mass of dimethylpolysiloxane having both molecular chain terminals blocked with trimethoxysiloxy groups and having a viscosity of 700 mPa·s, 4 parts by mass of hydrophobic fumed silica having a BET specific surface area of 200 m$^2$/g, 2 parts by mass of methyltrimethoxysilane, 0.02 parts by mass of mercaptobenzothiazole, 1.1 parts by mass of zinc oxide powder having a BET specific surface area of 75 m$^2$/g, and 2 parts by mass of diisopropoxybis(ethylacetoacetate)titanium were mixed to prepare a room temperature curable organopolysiloxane composition. A test piece was manufactured using this composition to carry out sulfur corrosion testing. The results of sulfur corrosion testing, as well as the resistance value, are shown in Table 1.

Practical Example 2

A room temperature curable organopolysiloxane composition was prepared as in Practical Example 1, except that the blending amount of zinc oxide powder was 5.7 parts by mass. A test piece was manufactured using this composition to carry out sulfur corrosion testing. The results of sulfur corrosion testing, as well as the resistance value, are shown in Table 1.

Practical Example 3

A room temperature curable organopolysiloxane composition was prepared as in Practical Example 1, except that the blending amount of zinc oxide powder was 12.0 parts by mass. A test piece was manufactured using this composition to carry out sulfur corrosion testing. The results of sulfur corrosion testing, as well as the resistance value, are shown in Table 1.

Comparative Example 1

A room temperature curable organopolysiloxane composition was prepared as in Practical Example 1, except that mercaptobenzothiazole and zinc oxide powder were not blended. A test piece was manufactured using this composition to carry out sulfur corrosion testing. The results of sulfur corrosion testing, as well as the resistance value, are shown in Table 1.

Comparative Example 2

A room temperature curable organopolysiloxane composition was prepared as in Practical Example 1, except that zinc oxide powder was not blended. A test piece was manufactured using this composition to carry out sulfur corrosion testing. The results of sulfur corrosion testing, as well as the resistance value, are shown in Table 1.

Comparative Example 3

A room temperature curable organopolysiloxane composition was prepared as in Practical Example 1, except that mercaptobenzothiazole was not blended. A test piece was manufactured using this composition to carry out sulfur corrosion testing. The results of sulfur corrosion testing, as well as the resistance value, are shown in Table 1.

Comparative Example 4

A room temperature curable organopolysiloxane composition was prepared as in Practical Example 2, except that mercaptobenzothiazole was not blended. A test piece was manufactured using this composition to carry out sulfur corrosion testing. The results of sulfur corrosion testing, as well as the resistance value, are shown in Table 1.

Comparative Example 5

A room temperature curable organopolysiloxane composition was prepared as in Practical Example 3, except that mercaptobenzothiazole was not blended. A test piece was manufactured using this composition to carry out sulfur corrosion testing. The results of sulfur corrosion testing, as well as the resistance value, are shown in Table 1.

Comparative Example 6

A room temperature curable organopolysiloxane composition was prepared as in Practical Example 2, except that benzotriazole was blended instead of mercaptobenzothiazole. A test piece was manufactured using this composition to carry out sulfur corrosion testing. The results of sulfur corrosion testing, as well as the resistance value, are shown in Table 1.

TABLE 1

| | Category | | | | | | | | |
|---|---|---|---|---|---|---|---|---|---|
| | Practical Examples | | | Comparative Examples | | | | | |
| Item | 1 | 2 | 3 | 1 | 2 | 3 | 4 | 5 | 6 |
| Presence of corrosion | ○ | ○ | ○ | x | x | x | x | x | x |
| Resistance value (Ω) | 0.06 | 0.06 | 0.06 | 0.12 | 0.10 | 0.12 | 0.10 | 0.08 | 0.08 |

INDUSTRIAL APPLICABILITY

The room temperature curable organopolysiloxane composition for protecting electric/electronic parts according to the present invention can protect electric/electronic parts from corrosive gases such as hydrogen sulfide gas and sulfuric acid contained in the atmosphere, and is therefore suitable for the sealing, coating, adhesion, or part fixing of silver electrodes, silver chip resistors, etc.

The invention claimed is:

1. A room temperature curable organopolysiloxane composition for protecting electric/electronic parts, the room temperature curable organopolysiloxane composition comprising:
   (A) 100 parts by mass of an organopolysiloxane having a viscosity at 25° C. of 20 to 1,000,000 mPa·s and having at least two silicon atom-bonded alkoxy groups in a molecule;
   (B) 0.5 to 15 parts by mass of an alkoxysilane represented by the following general formula or a partial hydrolysis condensation product thereof:

$R^1_a Si(OR^2)_{(4-a)}$ wherein $R^1$ is a monovalent hydrocarbon group having a carbon number of 1 to 12, $R^2$ is an alkyl group having a carbon number of 1 to 3, and subscript "a" is an integer of 0 to 2;
   (C) 0.001 to 0.5 parts by mass of a mercaptobenzothiazole based compound;
   (D) 0.1 to 30 parts by mass of zinc oxide powder having a BET specific surface area of at least 10 m²/g; and
   (E) 0.1 to 10 parts by mass of a catalyst for condensation reactions.

2. The room temperature curable organopolysiloxane composition for protecting electric/electronic parts according to claim 1, wherein component (C) is mercaptobenzothiazole, dibenzothiazyl disulfide, a sodium salt of mercaptobenzothiazole, a zinc salt of mercaptobenzothiazole, a cyclohexylamine salt of mercaptobenzothiazole, morpholinodithiobenzothiazole, N-cyclohexyl-benzothiazolyl sulfenamide, N-oxydiethylene-benzothiazolyl sulfenamide, or N-tert-butylbenzothiazolyl sulfenamide.

3. The room temperature curable organopolysiloxane composition for protecting electric/electronic parts according to claim 1, wherein component (A) comprises a dimethylpolysiloxane having both molecular chain terminals blocked with trimethoxysiloxy groups.

4. The room temperature curable organopolysiloxane composition for protecting electric/electronic parts according to claim 1, wherein component (B) comprises a trifunctional alkoxysilane.

5. The room temperature curable organopolysiloxane composition for protecting electric/electronic parts according to claim 4, wherein component (B) comprises methyltrimethoxysilane.

6. The room temperature curable organopolysiloxane composition for protecting electric/electronic parts according to claim 1, wherein component (C) comprises mercaptobenzothiazole.

7. The room temperature curable organopolysiloxane composition for protecting electric/electronic parts according to claim 1, wherein the zinc oxide powder has a BET specific surface area of at least 50 m²/g.

8. The room temperature curable organopolysiloxane composition for protecting electric/electronic parts according to claim 1, wherein component (E) comprises a titanium compound.

9. The room temperature curable organopolysiloxane composition for protecting electric/electronic parts according to claim 1, further comprising a filler different from component (D).

10. A cured product formed from the room temperature curable organopolysiloxane composition for protecting electric/electronic parts according to claim 1.

11. An electric/electronic part comprising the cured product according to claim 10.

12. The room temperature curable organopolysiloxane composition for protecting electric/electronic parts according to claim 9, comprising an inorganic filler comprising silica.

* * * * *